US011270218B2

(12) United States Patent
Seow et al.

(10) Patent No.: US 11,270,218 B2
(45) **Date of Patent: *Mar. 8, 2022**

(54) MAPPER COMPONENT FOR A NEURO-LINGUISTIC BEHAVIOR RECOGNITION SYSTEM

(71) Applicant: Intellective Ai, Inc., Dallas, TX (US)

(72) Inventors: Ming-Jung Seow, Richmond, TX (US); Gang Xu, Houston, TX (US); Tao Yang, Katy, TX (US); Wesley Kenneth Cobb, The Woodlands, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,456

(22) Filed: Jun. 28, 2019

(65) Prior Publication Data

US 2020/0167679 A1 May 28, 2020

Related U.S. Application Data

(63) Continuation of application No. 14/569,034, filed on Dec. 12, 2014, now Pat. No. 10,373,062.

(51) Int. Cl.
*G06N 7/00* (2006.01)
*G06K 9/42* (2006.01)
(Continued)

(52) U.S. Cl.
CPC ............... *G06N 7/005* (2013.01); *G06K 9/42* (2013.01); *G06K 9/6218* (2013.01);
(Continued)

(58) Field of Classification Search
CPC ...... G06K 9/42; G06K 9/6251; G06K 9/6255; G06K 9/6218; G06K 9/723; H01B 1/02; G06N 7/005
(Continued)

(56) References Cited

U.S. PATENT DOCUMENTS 5,760,716 A * 6/1998 Mathews ................ G06T 9/005 341/106
5,872,850 A * 2/1999 Klein ...................... G06F 16/30 705/51

(Continued)

OTHER PUBLICATIONS

International Search Report and Written Opinion for International Application No. PCT/US2015/064943, dated Feb. 9, 2016, 6 pages.

(Continued)

*Primary Examiner* — Kuen S Lu
(74) *Attorney, Agent, or Firm* — Cooley LLP

(57) ABSTRACT

Techniques are disclosed for generating a sequence of symbols based on input data for a neuro-linguistic model. The model may be used by a behavior recognition system to analyze the input data. A mapper component of a neuro-linguistic module in the behavior recognition system receives one or more normalized vectors generated from the input data. The mapper component generates one or more clusters based on a statistical distribution of the normalized vectors. The mapper component evaluates statistics and identifies statistically relevant clusters. The mapper component assigns a distinct symbol to each of the identified clusters.

20 Claims, 6 Drawing Sheets

300

Begin

Receive (or retrieve) data from the source input device; evaluate data — 305

Normalize each raw data value to a value within a range of 0 and 1, relative to value type — 310

Evaluate recent average, historical high and lows for each value — 315

Send normalized values, ID for each value, recent average, historical high value, and historical low value to the sensory memory component. — 320

End

(51) Int. Cl.
*G06K 9/62* (2006.01)
*G06K 9/72* (2006.01)
*H01B 1/02* (2006.01)

(52) U.S. Cl.
CPC ......... *G06K 9/6251* (2013.01); *G06K 9/6255* (2013.01); *G06K 9/723* (2013.01); *H01B 1/02* (2013.01)

(58) Field of Classification Search
USPC .......................................................... 707/738
See application file for complete search history.

(56) References Cited

U.S. PATENT DOCUMENTS 8,150,624 B2 * 4/2012 Berardi .................. G01B 21/22 701/500
8,170,283 B2 * 5/2012 Cobb ................. G06K 9/00771 382/103
8,270,732 B2 * 9/2012 Cobb .................. G06K 9/6222 382/224
8,300,924 B2 * 10/2012 Eaton ...................... G06F 15/16 382/159
10,373,062 B2 8/2019 Seow et al.
2004/0034633 A1 * 2/2004 Rickard ................ G06F 16/951
2007/0112714 A1 * 5/2007 Fairweather ....... G06K 13/0825 706/46
2010/0121572 A1 5/2010 Berardi et al.
2011/0064268 A1 3/2011 Cobb et al.
2014/0018682 A1 * 1/2014 Baba ......................... G06T 7/12 600/443
2016/0171096 A1 6/2016 Seow et al.

OTHER PUBLICATIONS

Roggen, D. et al., “Recognition of Crowd Behavior From Mobile Sensors with Pattern Analysis and Graph Clustering Methods,” Networks and Heterogeneous Media, 6(3):521-544 (Sep. 2011).

* cited by examiner

MAPPER COMPONENT FOR A NEURO-LINGUISTIC BEHAVIOR RECOGNITION SYSTEM

CROSS-REFERENCE TO RELATED APPLICATION

This application is a continuation of co-pending U.S. patent application Ser. No. 14/569,034, filed on Dec. 12, 2014, the entire content of which is herein expressly incorporated by reference for all purposes.

BACKGROUND

Field

Embodiments described herein generally relate to data analysis systems, and more particularly, to generating symbols based on input data to be used in a neuro-linguistic behavioral recognition system.

Description of the Related Art

Many currently available surveillance and monitoring systems (e.g., video surveillance systems, SCADA monitoring systems, and the like) are trained to observe specific activities or patterns and alert an administrator when an occurrence of a predefined activity or pattern is detected. However, such systems require advance knowledge of what actions and/or objects to observe. The activities may be hard-coded into underlying applications or the system may train itself based on provided definitions. In other words, unless the underlying code includes descriptions of certain behaviors, the system is incapable of recognizing such behaviors.

In addition, many monitoring systems, e.g., video surveillance systems, require a significant amount of computing resources, including processor power, storage, and bandwidth. For example, typical video surveillance systems require a large amount of computing resources per camera feed because of the typical size of video data. Given the cost of the resources, such systems are difficult to scale.

SUMMARY

One embodiment presented herein includes a method for generating a sequence of symbols based on a stream of normalized vectors generated from input data. The method generally includes receiving a normalized vector of feature values generated from input data. Each feature value is associated with one of a plurality of features. For each feature value in the normalized vector, a distribution of one or more clusters in a cluster space corresponding to one of the plurality of features associated with the feature value is evaluated, and the feature value is mapped to one of the clusters based on the distribution.

Another embodiment presented herein includes a computer-readable storage medium storing instructions, which, when executed on a processor, performs an operation for generating a sequence of symbols based on a stream of normalized vectors generated from input data. The operation itself generally includes receiving a normalized vector of feature values generated from input data. Each feature value is associated with one of a plurality of features. For each feature value in the normalized vector, a distribution of one or more clusters in a cluster space corresponding to one of the plurality of features associated with the feature value is evaluated, and the feature value is mapped to one of the clusters based on the distribution.

Yet another embodiment presented herein includes a system having a processor and a memory storing one or more application programs configured to perform an operation for generating a sequence of symbols based on a stream of normalized vectors generated from input data. The operation itself generally includes receiving a normalized vector of feature values generated from input data. Each feature value is associated with one of a plurality of features. For each feature value in the normalized vector, a distribution of one or more clusters in a cluster space corresponding to one of the plurality of features associated with the feature value is evaluated, and the feature value is mapped to one of the clusters based on the distribution.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
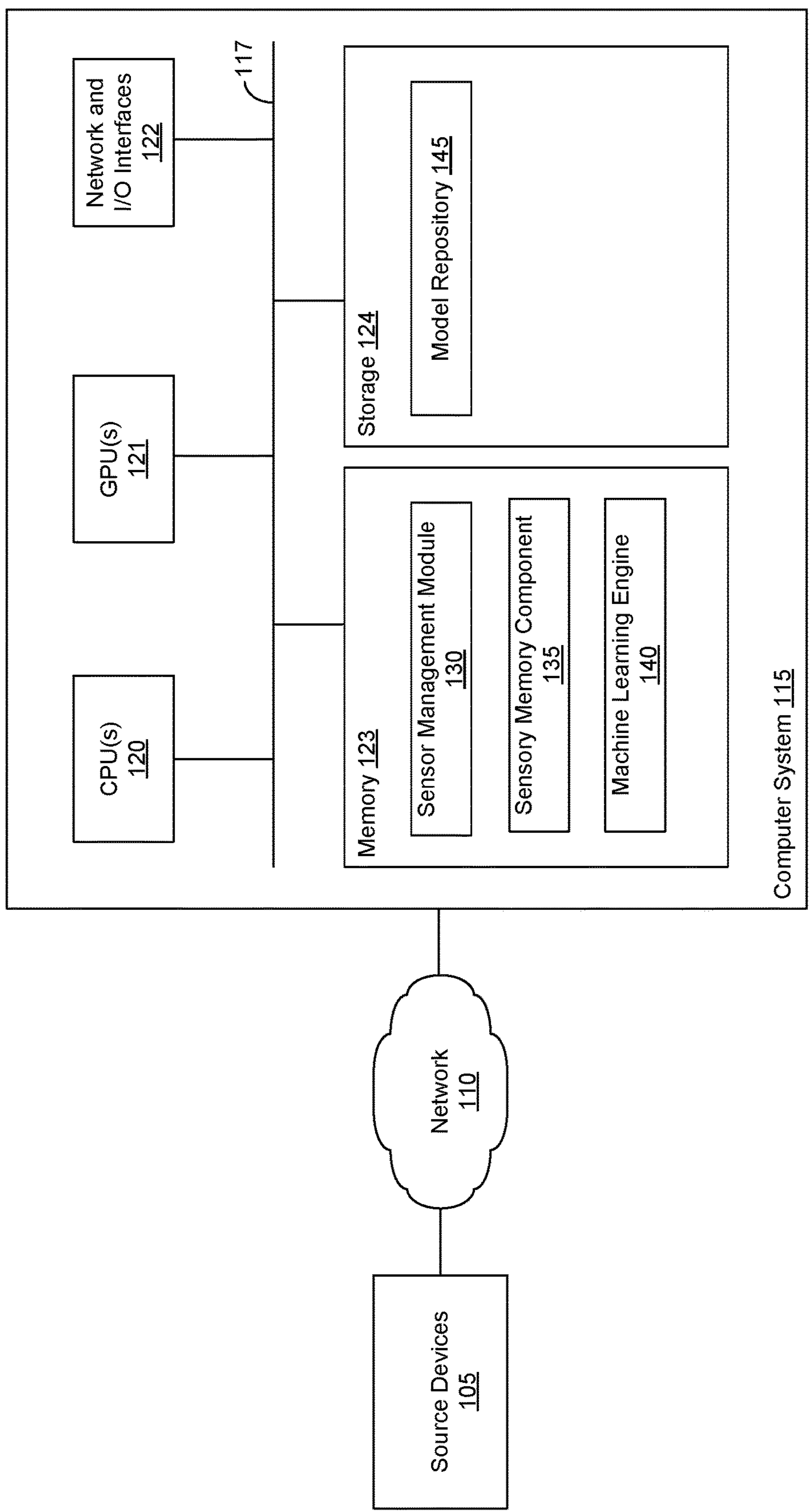
FIG. 1 illustrates an example computing environment for a neuro-linguistic behavior recognition system, according to one embodiment.

Embodiments presented herein describe a behavior recognition system. The behavior recognition system may be configured with one or more data collector components that collect raw data values from different data sources (e.g., video data, building management data, SCADA data). For example, a behavior recognition system may be configured for video surveillance. The behavior recognition system may include a data collector component that retrieves video frames in real-time, separates foreground objects from background objects, and tracks foreground objects from frame-to-frame. The data collector component may normalize the video frame data into numerical values (e.g., falling within a range from 0 to 1 with respect to a given data type).

In one embodiment, the behavior recognition system includes a neuro-linguistic module that performs neural network-based linguistic analysis on the collected data. Specifically, for each type of data monitored by a sensor, the neuro-linguistic module creates and refines a linguistic model of the normalized data. That is, the neuro-linguistic module builds a grammar used to describe the normalized data. The linguistic model includes symbols that serve as building blocks for the grammar. The neuro-linguistic module identifies combinations of symbols to build a dictionary of words. Once the dictionary is built, the neuro-linguistic module identifies phrases that include various combinations of words in the dictionary. The behavior recognition system uses such a linguistic model to describe what is being observed. The linguistic model allows the behavior recognition system to distinguish between normal and abnormal activity observed in the input data. As a result, the behavior recognition system can issue alerts whenever abnormal activity occurs.

To generate the linguistic model, a neuro-linguistic module receives normalized data values and organizes the data into clusters. The neuro-linguistic module evaluates statistics of each cluster and identifies statistically relevant clusters. Further, the neuro-linguistic module generates symbols, e.g., letters, corresponding to each statistically relevant cluster. Thus, input values mapping to a given cluster may correspond to a symbol.

The neuro-linguistic module generates a lexicon, i.e., builds a dictionary, of observed combinations of symbols, i.e., words, based on a statistical distribution of symbols identified in the input data. Specifically, the neuro-linguistic module may identify patterns of symbols in the input data at different frequencies of occurrence. Further, the neuro-linguistic module can identify statistically relevant combinations of symbols at different lengths (e.g., from one-symbol to a maximum-symbol word length). The neuro-linguistic module may include such statistically relevant combinations of symbols in a dictionary used to identify phrases for the linguistic model.

Using words from the dictionary, the neuro-linguistic module generates phrases based on probabilistic relationships of each word occurring in sequence relative to other words as additional data is observed. For example, the neuro-linguistic module may identify a relationship between a given three-letter word that frequently appears in sequence with a given four-letter word, and so on. The neuro-linguistic module determines a syntax based on the identified phrases.

The syntax allows the behavior recognition system to learn, identify, and recognize patterns of behavior without the aid or guidance of predefined activities. Unlike a rules-based surveillance system, which contains predefined patterns of what to identify or observe, the behavior recognition system learns patterns by generalizing input and building behavior memories of what is observed. Over time, the behavior recognition system uses these memories to distinguish between normal and anomalous behavior reflected in observed data.

For instance, the neuro-linguistic module builds letters, words, phrases, and estimates an "unusualness score" for each identified letter, word, or phrase. The unusualness score (for a letter, word, or phrase observed in input data) provides a measure of how infrequently the letter, word, or phrase has occurred relative to past observations. Thus, the behavior recognition system may use the unusualness scores to both measure how unusual a current syntax is, relative to a stable model of symbols (i.e., letters), a stable model of words built from the symbols (i.e., a dictionary) and a stable model of phrase built from the words (i.e., a syntax)—collectively the neuro-linguistic model.

As the neuro-linguistic module continues to receive input data, the neuro-linguistic module may decay, reinforce, and generate the letters, words, and syntax models. In parlance with the machine learning field, the neuro-linguistic module "learns on-line" as new data is received and occurrences a given type of input data either increases, decreases, appears, or disappears.

FIG. 1 illustrates components of a behavioral recognition system 100, according to one embodiment. As shown, the behavioral recognition system 100 includes one or more input source devices 105, a network 110, and one or more computer systems 115. The network 110 may transmit data input by the source devices 105 to the computer system 115. Generally, the computing environment 100 may include one or more physical computer systems 115 connected via a network (e.g., the Internet). Alternatively, the computer systems 115 may be cloud computing resources connected by the network. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The storage 124 includes a model repository 145.

The CPU 120 retrieves and executes programming instructions stored in the memory 123 as well as stores and retrieves application data residing in the storage 124. In one embodiment, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. The parallel throughput architecture provides thousands of cores for processing the application and input data. As a result, the GPU 121 leverages the thousands of cores to perform read and write operations in a massively parallel fashion. Taking advantage of the parallel computing elements of the GPU 121 allows the behavior recognition system 100 to better process large amounts of incoming data (e.g., input from a video and/or audio source). As a result, the behavior recognition system 100 may scale with relatively less difficulty.

The sensor management module 130 provides one or more data collector components. Each of the collector components is associated with a particular input data source, e.g., a video source, a SCADA (supervisory control and data acquisition) source, an audio source, etc. The collector components retrieve (or receive, depending on the sensor) input data from each source at specified intervals (e.g., once a minute, once every thirty minutes, once every thirty seconds, etc.). The sensor management module 130 controls the communications between the data sources. Further, the sensor management module 130 normalizes input data and sends the normalized data to the sensory memory component 135.

The sensory memory component 135 is a data store that transfers large volumes of data from the sensor management module 130 to the machine learning engine 140. The sensory memory component 135 stores the data as records. Each record may include an identifier, a timestamp, and a data payload. Further, the sensory memory component 135 aggregates incoming data in a time-sorted fashion. Storing incoming data from each of the data collector components in a single location where the data may be aggregated allows the machine learning engine 140 to process the data efficiently. Further, the computer system 115 may reference data stored in the sensory memory component 135 in generating alerts for anomalous activity. In one embodiment, the sensory memory component 135 may be implemented in via a virtual memory file system in the memory 123. In another embodiment, the sensory memory component 135 is implemented using a key-value share.

The machine learning engine 140 receives data output from the sensor management module 135. Generally, components of the machine learning engine 140 generate a linguistic representation of the normalized vectors. As described further below, to do so, the machine learning engine 140 clusters normalized values having similar features and assigns a distinct symbol to each cluster. The machine learning engine 140 may then identify recurring combinations of symbols (i.e., words) in the data. The machine learning engine 140 then similarly identifies recurring combinations of words (i.e., phrases) in the data.

Note, however, FIG. 1 illustrates merely one possible arrangement of the behavior recognition system 100. For example, although the input data sources 105 are shown connected to the computer system 115 via network 110, the network 110 is not always present or needed (e.g., an input source such as a video camera may be directly connected to the computer system 115).

Figure 2:
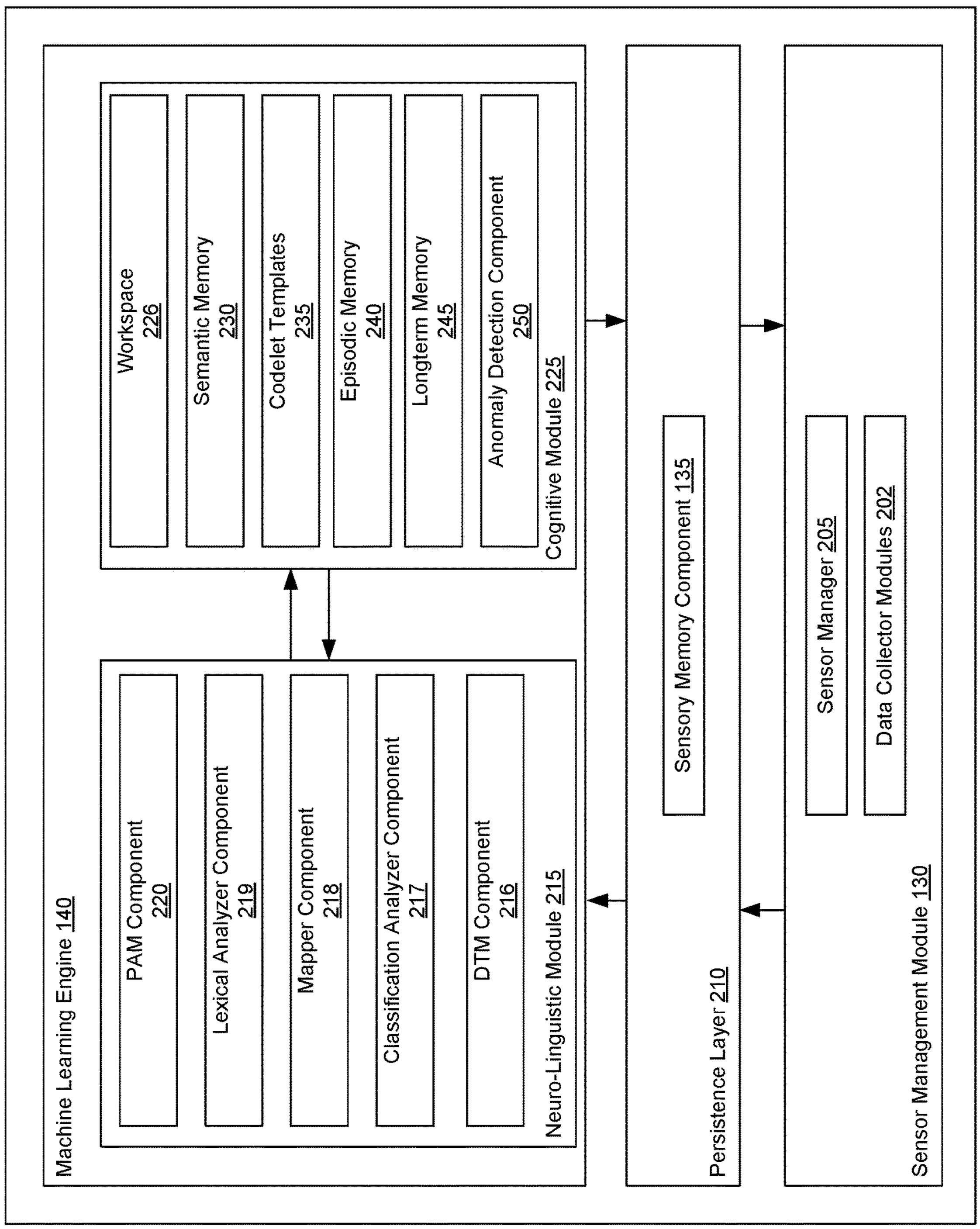
FIG. 2 illustrates a system architecture of a neuro-linguistic behavior recognition system, according to one embodiment.

FIG. 2 illustrates a system architecture of the behavior recognition system, according to one embodiment. As shown, the sensor management module 130 and the machine learning engine 140 communicate via a persistence layer 210.

The persistence layer 210 includes data stores that maintain information used by components of the computer system 115. For example, the persistence layer 210 includes data stores that maintain information describing properties of the data collector modules 202, system properties (e.g., serial numbers, available memory, available capacity, etc. of the computer system 115), and properties of the source driver (e.g., active plug-ins 118, active sensors associated with each data source, normalization settings, etc.). Other data stores may maintain learning model information, system events, and behavioral alerts. In addition, the sensory memory component 135 resides in the persistence layer 210.

The machine learning engine 140 itself includes a neuro-linguistic module 215 and a cognitive module 225. The neuro-linguistic module 215 performs neural network-based linguistic analysis of normalized input data to build a neuro-linguistic model of the observed input data. The behavior recognition system can use the linguistic model to describe subsequently observed activity. However, rather than describing the activity based on predefined objects and actions, the neuro-linguistic module 215 develops a custom language based on symbols, words, and phrases generated from the input data. As shown, the neuro-linguistic module 215 includes a data transactional memory (DTM) component 216, a classification analyzer component 217, a mapper component 218, a lexical analyzer component 219, and a perceptual associative memory (PAM) component 220.

In one embodiment, the DTM component 216 retrieves the normalized vectors of input data from the sensory memory component 135 and stages the input data in the pipeline architecture provided by the GPU 121. The classification analyzer component 217 evaluates the normalized data organized by the DTM component 216 and maps the data on a neural network. In one embodiment, the neural network is a combination of a self-organizing map (SOM) and an adaptive resonance theory (ART) network.

The mapper component 218 clusters the data streams based on values occurring repeatedly in association with one another. Further, the mapper component 218 generates a set of clusters for each input feature. For example, assuming that the input data corresponds to video data, features may include location, velocity, acceleration, etc. The mapper component 218 would generate separate sets of clusters for each of these features. The mapper component 218 identifies symbols (i.e., builds an alphabet of letters) based on the clustered input data. Specifically, the mapper component 218 determines a statistical distribution of data in each cluster. For instance, the mapper component 218 determines a mean, variance, and standard deviation for the distribution of values in the cluster. The mapper component 218 also updates the statistics as more normalized data is received. Further, each cluster may be associated with a statistical significance score. The statistical significance for a given cluster increases as more data is received which maps to that cluster. In addition, the mapper component 218 decays the statistical significance of the cluster as the mapper component 218 observes data mapping to the cluster less often over time.

In one embodiment, the mapper component 218 assigns a set of symbols to clusters having statistical significance. A cluster has statistical significance if a threshold amount of input data mapping to that cluster is exceeded. A symbol may be described as a letter of an alphabet used to create words used in the neuro-linguistic analysis of the input data. A symbol provides a "fuzzy" representation of the data belonging to a given cluster.

Further, the mapper component 218 is adaptive. That is, the mapper component 218 may identify new symbols corresponding to new clusters generated from the normalized data, as such clusters are reinforced over time (resulting in such clusters reaching a level statistical significance relative to the other clusters that emerge from the input data). The mapper component 218 learns on-line and may merge similar observations to a more generalized cluster. The mapper component 218 may assign a set of distinct symbols to the resulting cluster.

Once a cluster has reached statistical significance (i.e., data observed as mapping to that cluster has reached a threshold amount of points), the mapper component 219 begins sending corresponding symbols to the lexical analyzer component 219 in response to normalized data that maps to that cluster. In one embodiment, the mapper component 218 limits symbols that can be sent to the lexical component 219 to the most statistically significant clusters. In practice, outputting symbols (i.e., letters) assigned to the top thirty-two clusters has shown to be effective. However, other amounts may also prove effective, such as the top sixty-four or 128 most frequently recurring clusters. Note, over time, the most frequently observed symbols may change as clusters increase (or decrease) in statistical significance. As such, it is possible for a given cluster to lose statistical significance. Over time, thresholds for statistical significance of a cluster can increase, and thus, if the amount of observed data mapping to a given cluster fails to meet a threshold, then the cluster loses statistical significance.

In one embodiment, the mapper component 218 evaluates an unusualness score for each symbol. The unusualness score is based on the frequency of a given symbol relative to other symbols observed in the input data stream, over time. The unusualness score may increase or decrease over time as the neuro-linguistic module 215 receives additional data.

The mapper component 218 sends a stream of the symbols (e.g., letters), timestamp data, unusualness scores, and statistical data (e.g., a representation of the cluster associated with a given symbol) to the lexical analyzer component 219. The lexical analyzer component 219 builds a dictionary based on symbols output from the mapper component 218. In practice, the mapper component 218 may need approximately 5000 observations (i.e., normalized vectors of input data) to generate a stable alphabet of symbols.

The lexical analyzer component 219 builds a dictionary that includes combinations of co-occurring symbols, e.g., words, from the symbols transmitted by the mapper component 218. The lexical analyzer component 219 identifies repeating co-occurrences of letters output from the mapper component 218 and calculates frequencies of the co-occurrences throughout the symbol stream. The combinations of symbols may semantically represent a particular activity, event, etc.

In one embodiment, the lexical analyzer component 219 limits the length of words in the dictionary to allow the lexical analyzer component 219 to identify a number of possible combinations without adversely affecting the performance of the computer system 115. Further, the lexical analyzer component 219 may use level-based learning models to analyze symbol combinations and learn words. The lexical analyzer component 219 learns words up through a maximum symbol combination length at incremental levels, i.e., where one-letter words are learned at a first level, two-letter words are learned at a second level, and so on. In practice, limiting a word to a maximum of five or six symbols (i.e., learning at a maximum of five or six levels) has shown to be effective.

Like the mapper component 218, the lexical analyzer component 219 is adaptive. That is, the lexical analyzer component 219 may learn and generate words in the dictionary over time. The lexical analyzer component 219 may also reinforce or decay the statistical significance of words in the dictionary as the lexical analyzer component 219 receives subsequent streams of symbols over time. Further, the lexical analyzer component 219 may determine an unusualness score for each word based on how frequently the word recurs in the data. The unusualness score may increase or decrease over time as the neuro-linguistic module 215 processes additional data.

In addition, as additional observations (i.e., symbols) are passed to the lexical analyzer component 219 and identified as a being part of a given word, the lexical analyzer component 219 may determine that the word model has matured. Once a word model has matured, the lexical analyzer component 219 may output observations of those words in the model to the PAM component 219. In one embodiment, the lexical analyzer component 219 limits words sent to the PAM component 320 to the most statistically significant words. In practice, for each single sample, outputting occurrences of the top thirty-two of the most frequently occurring words has shown to be effective (while the most frequently occurring words stored in the models can amount to thousands of words). Note, over time, the most frequently observed words may change as the observations of incoming letters change in frequency (or as new letters emerge by the clustering of input data by the mapper component 218.

Once the lexical analyzer component 219 has built the dictionary (i.e., identifies words that have reached a predefined statistical significance), the lexical analyzer component 219 sends occurrences of words subsequently observed in the input stream to the PAM component 220. The PAM component 220 builds a syntax of phrases from the words output by the lexical analyzer component 219. In practice, lexical analyzer component 219 may build a useful dictionary of words after receiving approximately 15,000 observations (i.e., input letters from the mapper component 218).

The PAM component 220 identifies a syntax of phrases based on the sequence of words output from the lexical analyzer component 219. Specifically, the PAM component 220 receives the words identified by the lexical analyzer component 219 generates a connected graph, where the nodes of the graph represent the words, and the edges represent a relationship between the words. The PAM component 220 may reinforce or decay the links based on the frequency that the words are connected with one another in a data stream.

Similar to the mapper component 218 and the lexical analyzer component 219, the PAM component 220 determines an unusualness score for each identified phrase based on how frequently the phrase recurs in the linguistic data. The unusualness score may increase or decrease over time as the neuro-linguistic module 215 processes additional data.

Similar to the lexical analyzer component 219, the PAM component 220 may limit the length of a given phrase to allow the PAM component 220 to be able to identify a number of possible combinations without adversely affecting the performance of the computer system 115.

The PAM component 220 identifies syntax phrases over observations of words output from the lexical analyzer component 219. As observations of words accumulate, the PAM component 220 may determine that a given phrase has matured, i.e., a phrase has reached a measure of statistical significance. The PAM component 220 then outputs observations of that phrase to the cognitive module 225. The PAM component 220 sends data that includes a stream of the symbols, words, phrases, timestamp data, unusualness scores, and statistical calculations to the cognitive module 325. In practice, the PAM component 220 may obtain a meaningful set of phrases after observing about 5000 words from the lexical analyzer component 219.

After maturing, the generated letters, words, and phrases form a stable neuro-linguistic model of the input data that the computer system 115 uses to compare subsequent observations of letters, words, and phrases against the stable model. The neuro-linguistic module 215 updates the linguistic model as new data is received. Further, the neuro-linguistic module 215 may compare a currently observed syntax to the model. That is, after building a stable set of letters, the neuro-linguistic module 215 may build a stable model of words (e.g., a dictionary). In turn, the neuro-linguistic module 215 may be used to build a stable model of phrases (e.g., a syntax). Thereafter, when the neuro-linguistic module 215 receives subsequently normalized data, the module 215 can output an ordered stream of symbols, words, and phrases, all of which can be compared to the stable model to identify interesting patterns or detect deviations occurring in the stream of input data.

As shown, the cognitive module 226 includes a workspace 226, a semantic memory 230, codelet templates 235, episodic memory 240, long term memory 245, and an anomaly detection component 250. The semantic memory 230 stores the stable neuro-linguistic model described above, i.e., a stable copy from the mapper component 218, lexical analyzer component 219, and the PAM component 220.

In one embodiment, the workspace 226 provides a computational engine for the machine learning engine 140. The workspace 226 performs computations (e.g., anomaly modeling computations) and stores intermediate results from the computations.

The workspace 226 retrieves the neuro-linguistic data from the PAM component 220 and disseminates this data to different portions of the cognitive module 225 as needed.

The episodic memory 240 stores linguistic observations related to a particular episode in the immediate past and may encode specific details, such as the "what" and the "when" of a particular event.

The long-term memory 245 stores generalizations of the linguistic data with particular episodic details stripped away. In this way, when a new observation occurs, memories from the episodic memory 240 and the long-term memory 245 may be used to relate and understand a current event, i.e., the new event may be compared with past experience (as represented by previously observed linguistic data), leading to both reinforcement, decay, and adjustments to the information stored in the long-term memory 245, over time. In a particular embodiment, the long-term memory 245 may be implemented as an ART network and a sparse-distributed memory data structure. Importantly, however, this approach does not require events to be defined in advance.

The codelet templates 235 provide a collection of executable codelets, or small pieces of code that evaluate different sequences of events to determine how one sequence may follow (or otherwise relate to) another sequence. The codelet templates 325 may include deterministic codelets and stochastic codelets. More generally, a codelet may detect interesting patterns from the linguistic representation of input data. For instance, a codelet may compare a current observation (i.e., a current phrase instance with what has been observed in the past) with previously observed activity.

The anomaly detection component 250 evaluates unusualness scores sent by the neuro-linguistic module 215 to determine whether to issue an alert in response to some abnormal activity indicated by the unusualness scores. Specifically, the anomaly detection component 250 is provides probabilistic histogram models, e.g., an unusual lexicon score model, an unusual syntax score model, and an anomaly model, which represent the unusualness scores. The unusual lexicon score model and unusual syntax score model are generated based on unusualness scores sent from the lexical analyzer component 219 and the PAM component 220. The anomaly model receives input percentiles from the unusual lexicon score model and unusual syntax score model and generates an absolute unusualness score based on the percentiles. The anomaly detection component 250 evaluates the scores and determines whether to send an alert based on a given score. The anomaly detection component 250 may send alert data to an output device, where an administrator may view the alert, e.g., via a management console.

The cognitive module 225 performs learning analysis on the linguistic content delivered to semantic memory 230 (i.e., the identified symbols, words, phrases) by comparing new observations to the learned patterns in the stable neuro-linguistic model kept in semantic memory 230 and then estimating the rareness of these new observations.

Specifically, the anomaly detection component 250 evaluates the unusualness scores of each of the symbols, words, and phrases to identify abnormal occurrences in the observed data. Once an anomalous observation has been identified, the anomaly component may issue an alert (e.g., notify an administrator or user of the computer system 115).

Figure 3:
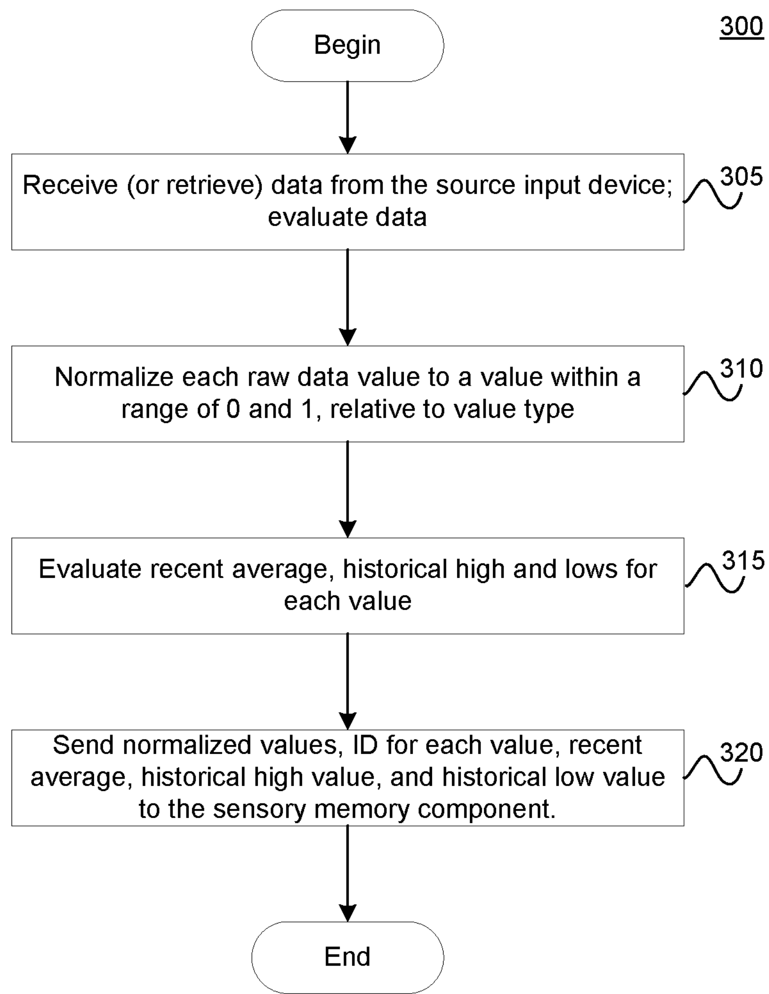
FIG. 3 illustrates a method for collecting sensor data for use in a neuro-lingustic behavior recognition system, according to one embodiment.

FIG. 3 illustrates a method 300 for collecting sensor data for use in a neuro-lingustic behavior recognition system, according to one embodiment. More specifically, method 300 describes a method for a data collector to retrieve data from an associated input device and send the data to the neuro-linguistic module 215. For this example, assume that a data collector module 202 is a video source capturing image data at a given frame rate. Of course, a variety of data collector components 202 can be used.

Method 300 begins at step 305, where the data collector module 202 retrieves (or receives) data from the source input device. In this case, the data collector module 202 may retrieve video frames from a video source, such as a video camera positioned to observe a particular location, such as a hotel lobby. Further, the data collector module 202 identifies data values to send to the sensory memory component 135. To do so, the data collector module 202 may evaluate the video frames to separate foreground objects from background objects, measure appearance and kinematic information of the identified foreground objects, and track foreground objects moving across the scene (i.e., the field of view of the camera). As a result, the data collector module 202 generates a set of data values characterizing appearance and kinematic aspects of the objects depicted in video frames.

At step 310, the data collector module 202 normalizes each data value to a numerical value falling within a range, e.g., between 0 to 1, inclusive, relative to the type of that data value. For example, values associated with kinematic features are normalized from 0 to 1 relative to other values associated with kinematic features. Doing so converts each value to a common format and allows the neuro-linguistic module 215 to recognize recurring events in the video stream.

After normalizing the values, at step 315, the data collector module 202 identifies additional data associated with the normalized values, such as a timestamp of a given value, an average associated with the data type (e.g., kinematic features, appearance features, location, position, etc.) of the value, and historical high and low values for that data type. Doing so allows the data collector module 202 to readjust the normalization in the event that the video source is modified. Specifically, the data collector module 202 references the identified historical values and averages to readjust the normalization.

At step 320, the data collector module 202 sends a vector of the normalized values and associated data to the sensory memory component 135. As stated, the sensory memory component 135 stores the normalized values and associated data. The neuro-linguistic module 215 may then retrieve the normalized values from the sensory memory component 135 and perform linguistic analysis thereafter.

Figure 4:
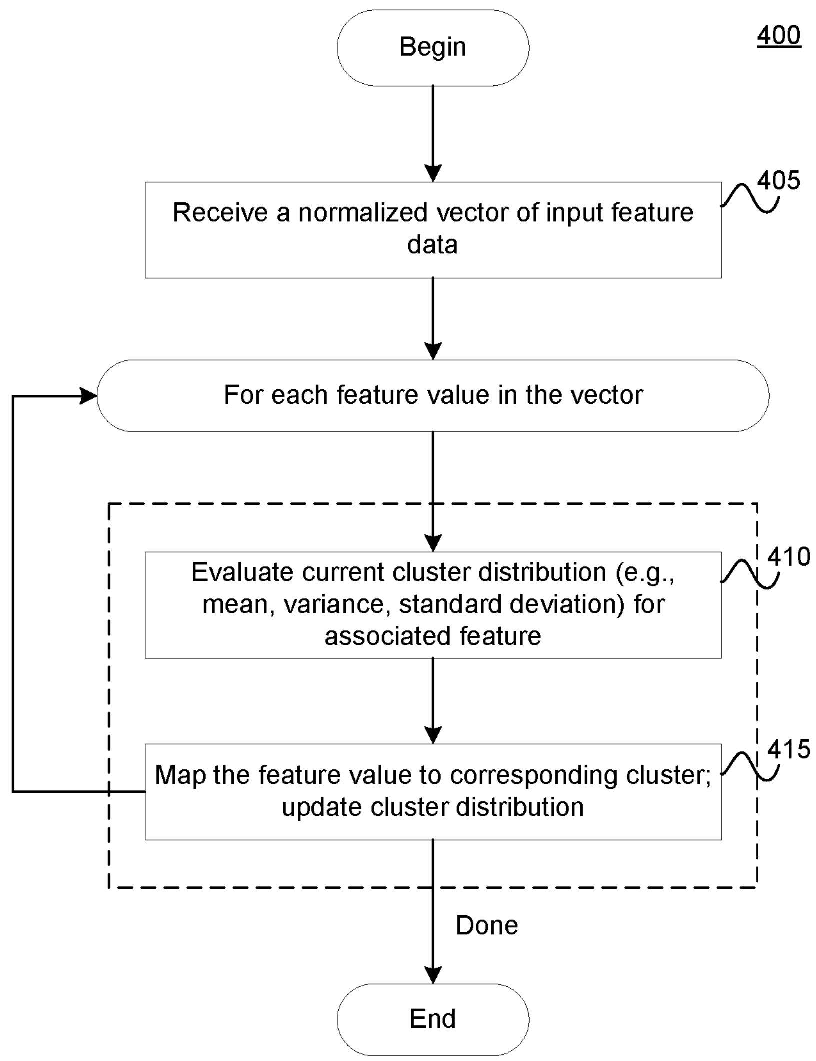
FIG. 4 illustrates a method for updating a cluster distribution during a learning phase of a mapper component in a neuro-linguistic behavior recognition system, according to one embodiment.

FIG. 4 illustrates a method 400 for updating a cluster distribution during a learning phase of the mapper component 218, according to one embodiment. Specifically, during the learning phase, the mapper component 218 generates clusters based on the normalized vectors sent from the sensory memory component 135. The mapper component 218 generates these clusters on a neural network, e.g., an adaptive resonance theory (ART) network. Further, during this phase, the mapper component 218 identifies statistically significant clusters, i.e., clusters having data that has been observed to have a threshold amount of points.

Method 400 begins at step 405, where the mapper component 218 receives a normalized vector of feature values. As stated, each vector includes values associated with features of the input data. For example, features for video data may include an x, y location, velocity, acceleration, etc. Each feature is associated with a distinct cluster space. That is, the mapper component 218 generates a set of clusters for each cluster independent of other clusters. In one embodiment, each feature value is normalized to a value between 0 and 1, inclusive. Further, each value maps to a point in the feature space.

For each feature value in the normalized vector, the mapper component 218 performs the following steps. At step 410, the mapper component 218 evaluates a current cluster distribution for the associated feature space. That is, the mapper component 218 evaluates point distribution statistics for each cluster, such as a mean, a variance, and a standard deviation. At initialization of the mapper component 218, each feature space includes one cluster. The first value observed for that feature space maps to that cluster and serves as the mean.

Figure 5:
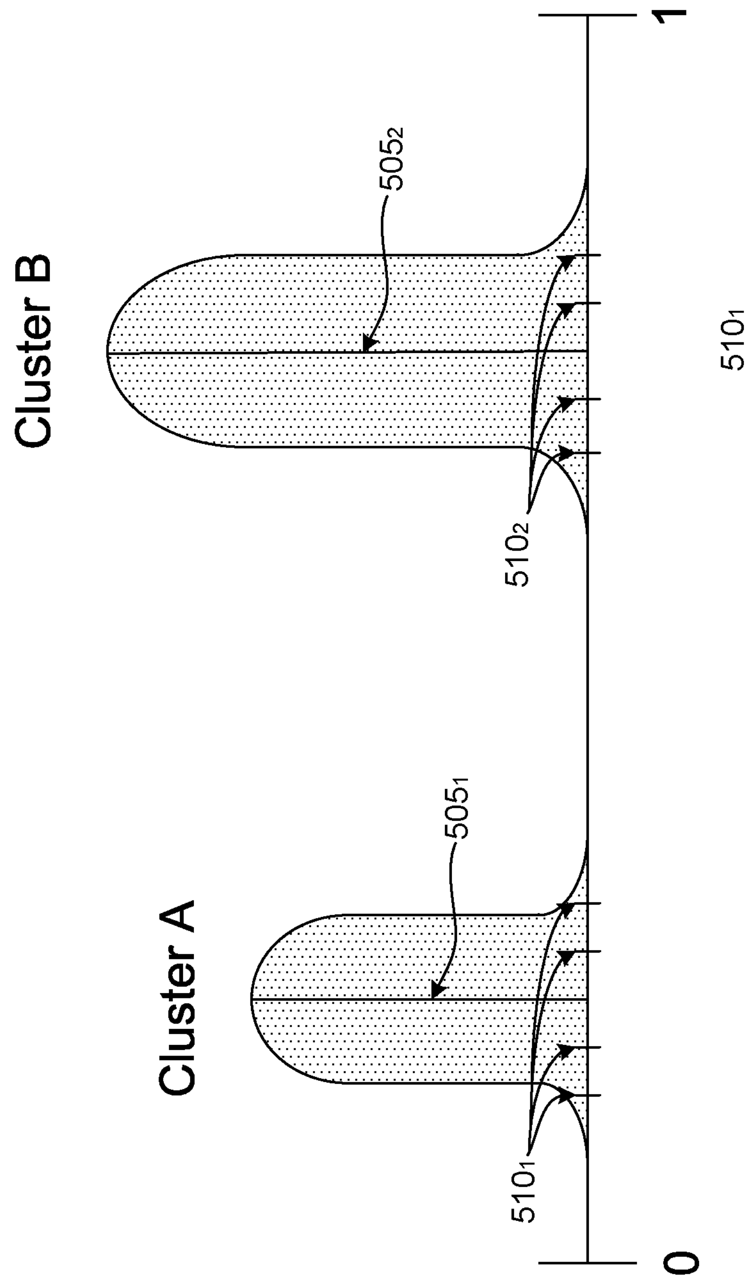
FIG. 5 illustrates an example cluster distribution, according to one embodiment.

At step 415, the mapper component 218 maps the feature value to a corresponding cluster. Generally, the feature value maps to a given cluster if the value falls within the variance of that cluster. If the feature value does not map to a particular cluster, the mapper component 218 may generate a new cluster and map the value to that cluster. Once mapped, the mapper component 218 updates the cluster distribution. Based on the updated distribution, the mapper component 218 can determine whether a cluster has become statistically significant. That is, if the mapper component 218 observes a threshold amount of feature values mapping to a given cluster, then the cluster has statistical significance. In such a case, the mapper component 218 can output a symbol associated with the cluster when subsequently observed. In one embodiment, the mapper component 218 may score the statistical significance based on an amount of observations of feature values mapping to a given cluster. FIG. 5 illustrates an example cluster distribution, according to one embodiment. Illustratively, the cluster distribution includes a cluster A and a cluster B along a 0 to 1 value range (inclusive). Cluster A represents a distribution of values relatively closer to 0, while cluster B represents a distribution of values relatively closer to 1. Each cluster includes a mean value, represented by the lines $\mathbf{505}_{1\text{-}2}$. Further, each cluster includes a number of values represented by the lines $\mathbf{510}_{1\text{-}2}$, each of which represent a value separate standard deviations from the mean.

In this example distribution, assume that cluster B has reached statistical significance. In such a case, when the mapper component 218 subsequently observes feature values that map to cluster B, the mapper component 218 outputs one of a set of symbols associated with cluster B to the lexical analyzer component 219. The symbol output to the lexical analyzer component 219 depends on where the value maps within cluster B. In one embodiment, a value that maps near (based on a degree of fuzziness) the mean value corresponds to a distinct symbol. Further, a value that maps near (based on a degree of fuzziness) one of the standard deviation values corresponds to a distinct symbol. In this case, cluster B is associated with five symbols.

Figure 6:
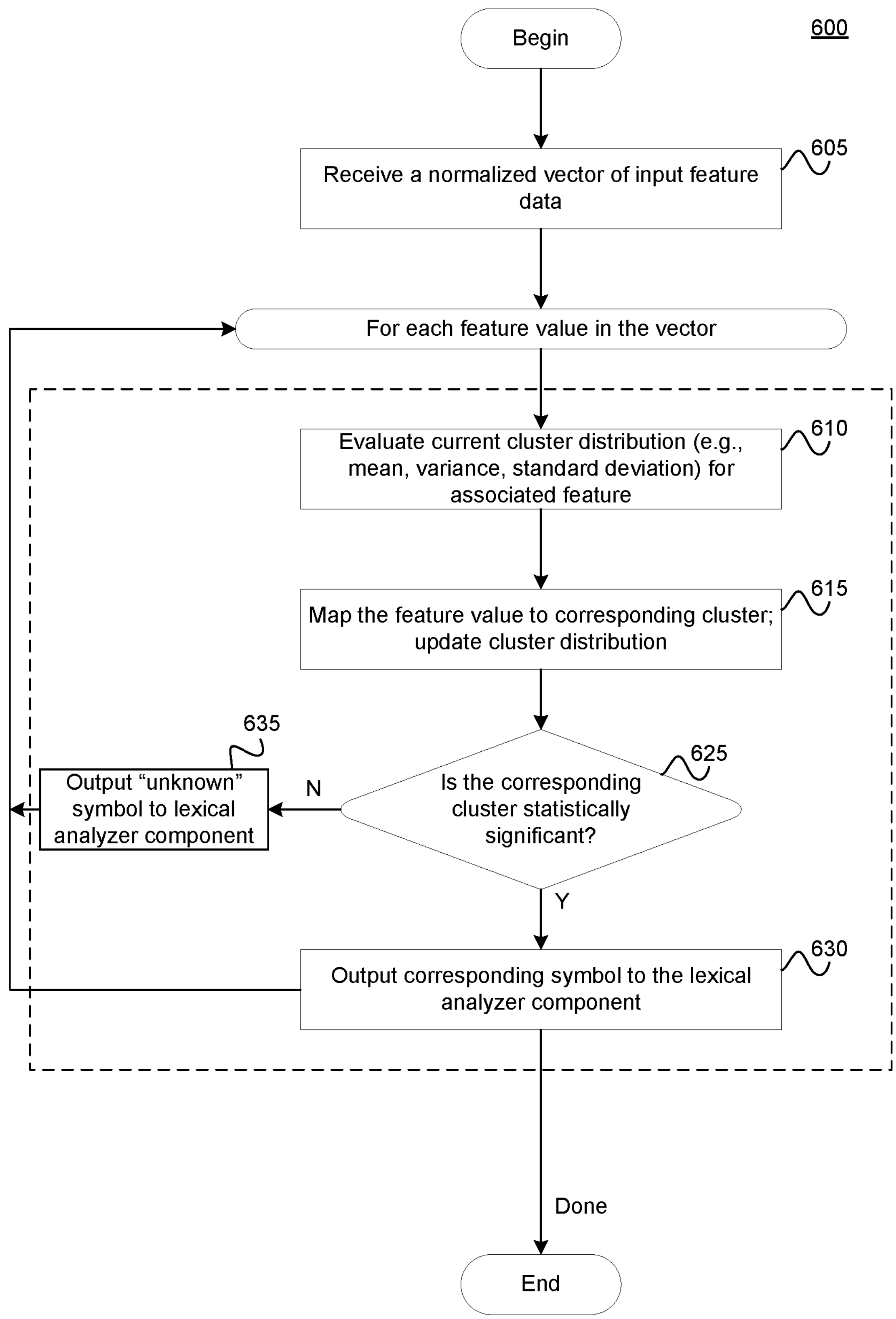
FIG. 6 illustrates a method for sending symbols to a lexical analyzer component in a neuro-linguistic behavior recognition system, according to one embodiment.

FIG. 6 illustrates a method 600 for sending symbols to the lexical analyzer component 219, according to one embodiment. More specifically, method 600 describes outputting symbols and updating clusters as the mapper component 218 subsequently receives normalized vectors. Method 600 begins at step 605, where the mapper component 218 receives a normalized vector of input feature values. As stated, the normalized vector includes input values within a range of 0 to 1, inclusive.

For each feature value, the mapper component 218 performs the following steps. At step 610, the mapper component 218 evaluates a current cluster distribution of the associated feature space (i.e., the mean, variance, standard deviation, etc.). Doing so allows the mapper component 218 to determine which cluster to map the feature value to.

At step 615, the mapper component 218 maps the feature value to a corresponding cluster. Once mapped, the mapper component 218 updates the distribution of that cluster, such as the mean, variance, and standard deviation. Further, the mapper component 218 uses the updated distribution to determine whether the cluster should be merged with another (e.g., if clusters begin to overlap with one another based on the updated distribution). The mapper component 218 also uses the updated distribution to determine whether to create additional cluster. Note, it is possible that a feature value does not map to any particular cluster. In such a case, the mapper component 218 can report such an instance to the lexical analyzer component 219 as unknown. In addition, the mapper component 218 determines whether the corresponding cluster is statistically significant based on the updated distribution (at step 625). In one embodiment, the mapper component 218 may score the statistical significance based on the amount of observations of feature values mapping to a given cluster.

If the cluster is statistically significant, the mapper component 218 outputs a corresponding symbol to the lexical analyzer component 219. As stated, the mapper component 218 determines the corresponding symbol relative to where the feature value is mapped to the cluster (e.g., relative to the mean, standard deviation). However, at step 635, if the feature value maps to a cluster that is not statistically significant (or if the feature value does not map to a cluster at all), then the mapper component 218 outputs the feature value as unknown to the lexical analyzer component 219.

Further, the mapper component 218 sends, to the lexical analyzer component 219, additional statistics to accompany the symbol, such as timestamp information, an unusualness score, frequency of occurrence, and the like. In turn, the lexical analyzer component 219 continues the neuro-linguistic analysis of the input by building a dictionary of words by identifying combinations of the symbols. The lexical analyzer component 219 may then output the dictionary of words to the PAM component 220. The PAM component 220 identifies phrases based on statistical frequencies of words appearing along with one another. Once identified, the PAM component 220 outputs the linguistic information (i.e., symbols, words, and phrases) to the cognitive module 220. As stated, the cognitive module 220 analyzes the linguistic information to learn and analyze normal and abnormal activity sent to the behavior recognition system.

One embodiment of the present disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

As described, embodiments herein provide techniques for generating symbols from data originating from an input source (e.g., video source, SCADA source, network security source, etc.) via a neuro-linguistic behavior recognition system. Once generated, the behavior recognition system uses the symbols to build a dictionary of words and establish a syntax, which forms the basis for a linguistic model used to describe input data observed by the behavior recognition system. The behavior recognition system analyzes and learns behavior based on the linguistic model to distinguish between normal and abnormal activity in observed data. Advantageously, this approach does not relying on predefined patterns to identify behaviors and anomalies but instead learns patterns and behaviors by observing a scene and generating information on what it observes.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

receiving a normalized vector of feature values generated from input data, each feature value from the normalized vector of feature values being calculated based on a feature from a plurality of features;

for each feature value in the normalized vector of feature values:

evaluating a distribution of a plurality of clusters in a cluster space corresponding to the feature from the plurality of features that is associated with the feature value, mapping the feature value to a single cluster from the plurality of clusters based on the distribution, updating the distribution of the plurality of clusters based on the mapping to produce an updated distribution, and determining, based on the updated distribution, whether or not to merge the plurality of clusters with a further cluster from the cluster space;

determining a symbol for a statistically significant cluster from the plurality of clusters; and transmitting the symbol to a behavior recognition system.

2. The method of claim 1, wherein the normalized vector of feature values is a first normalized vector of feature values, the input data is first input data, and the updated distribution is a first updated distribution, the method further comprising:

receiving a second normalized vector of feature values generated from second input data; and for each feature value in the second normalized vector of feature values:

mapping the feature value to a single cluster from the plurality of clusters, updating the distribution of the plurality of clusters based on the mapping, to produce a second updated distribution, and upon determining, based on the second updated distribution, that the single cluster has statistical significance, outputting a symbol from a plurality of symbols associated with the single cluster.

3. The method of claim 1, further comprising:

determining, based on the distribution of the plurality of clusters, that at least two clusters from the plurality of clusters overlap in the cluster space, and merging the at least two clusters in response to determining that the at least two clusters overlap in the cluster space.

4. The method of claim 1, wherein a statistical significance of each cluster from the plurality of clusters is determined based on a statistical significance score that indicates a number of the feature values that map to the cluster over time.

5. The method of claim 4, further comprising, upon determining that feature values mapping to the cluster have not been received after a period based on a function of time, decaying the statistical significance of the cluster.

6. The method of claim 1, wherein statistics associated with each cluster from the plurality of clusters include a mean, a variance, and a standard deviation.

7. The method of claim 1, wherein each feature value in the normalized vector of feature values is within a range of 0 and 1, inclusive.

8. A computer-readable storage medium storing instructions, which, when executed on a processor, performs an operation comprising:

receiving a normalized vector of feature values generated from input data, each feature value from the normalized vector of feature values being calculated based on a feature from a plurality of features;

for each feature value in the normalized vector of feature values:

evaluating a distribution of a plurality of clusters in a cluster space corresponding to the feature from the plurality of features that is associated with the feature value, mapping the feature value to a single cluster from the plurality of clusters based on the distribution, updating the distribution of the plurality of clusters based on the mapping to produce an updated distribution, and determining, based on the updated distribution, whether or not to merge the plurality of clusters with a further cluster from the cluster space;

determining a symbol for a statistically significant cluster from the plurality of clusters; and transmitting the symbol to a behavior recognition system.

9. The computer-readable storage medium of claim 8, wherein the normalized vector of feature values is a first normalized vector of feature values, the input data is first input data, and the updated distribution is a first updated distribution, the operation further comprising:

receiving a second normalized vector of feature values generated from second input data; and for each feature value in the second normalized vector of feature values:

mapping the feature value to a single cluster from the plurality of clusters, updating the distribution of the plurality of clusters based on the mapping, to produce a second updated distribution, and upon determining, based on the second updated distribution, that the single cluster has statistical significance, outputting a symbol from a plurality of symbols associated with the single cluster.

10. The computer-readable storage medium of claim 8, wherein the operation further comprises:

determining, based on the evaluated distribution of the plurality of clusters, that at least two clusters from the plurality of clusters overlap in the cluster space, and merging the at least two clusters in response to determining that the at least two clusters overlap in the cluster space.

11. The computer-readable storage medium of claim 8, wherein a statistical significance of each cluster from the plurality of clusters is determined based on a statistical significance score that indicates a number of the feature values that map to the cluster over time.

12. The computer-readable storage medium of claim 11, wherein the operation further comprises, upon determining that feature values mapping to the cluster have not been received after a period based on a function of time, decaying the statistical significance of the cluster.

13. The computer-readable storage medium of claim 8, wherein statistics associated with each cluster from the plurality of clusters include a mean, variance, and standard deviation.

14. The computer-readable storage medium of claim 8, wherein each feature value in the normalized vector of feature values is within a range of 0 and 1, inclusive.

15. A system, comprising:

a processor; and a memory storing one or more application programs configured to perform an operation comprising:

receiving a normalized vector of feature values generated from input data, each feature value from the normalized vector of feature values being calculated based on a feature from a plurality of features;

for each feature value in the normalized vector of feature values:

evaluating a distribution of a plurality of clusters in a cluster space corresponding to the feature from the plurality of features that is associated with the feature value, mapping the feature value to a single cluster from the plurality of clusters based on the distribution, updating the distribution of the plurality of clusters based on the mapping to produce an updated distribution, and determining, based on the updated distribution, whether or not to merge the plurality of clusters with a further cluster from the cluster space;

determining a symbol for a statistically significant cluster from the plurality of clusters; and transmitting the symbol to a behavior recognition system.

16. The system of claim 15, wherein the normalized vector of feature values is a first normalized vector of feature values, the input data is first input data, and the updated distribution is a first updated distribution, the operation further comprising:

receiving a second normalized vector of feature values generated from second input data; and for each feature value in the second normalized vector of feature values:

mapping the feature value to a single cluster from the plurality of clusters, updating the distribution of the plurality of clusters based on the mapping, to produce a second updated distribution, and upon determining, based on the second updated distribution, that the single cluster has statistical significance, outputting a symbol from a plurality of symbols associated with the single cluster.

17. The system of claim 15, wherein the operation further comprises:

determining, based on the evaluated distribution of the plurality of clusters, that at least two clusters from the plurality of clusters overlap in the cluster space, and merging the at least two clusters in response to determining that the at least two clusters overlap in the cluster space.

18. The system of claim 15, wherein a statistical significance of each cluster from the plurality of clusters is determined based on a statistical significance score that indicates a number of the feature values that map to the cluster over time.

19. The system of claim 15, wherein statistics associated with each cluster from the plurality of clusters include a mean, variance, and standard deviation.

20. The system of claim 15, wherein each feature value in the normalized vector of feature values is within a range of 0 and 1, inclusive.

* * * * *